(12) United States Patent
Arnold

(10) Patent No.: US 6,765,037 B2
(45) Date of Patent: Jul. 20, 2004

(54) PHOTOPOLYMERIZABLE EPOXY COMPOSITION

(75) Inventor: John R. Arnold, Burlington, CT (US)

(73) Assignee: Dymax Corporation, Torrington, CT (US)

( * ) Notice: Subject to any disclaimer, the term of this patent is extended or adjusted under 35 U.S.C. 154(b) by 0 days.

(21) Appl. No.: 09/996,534

(22) Filed: Nov. 28, 2001

(65) Prior Publication Data

US 2003/0105179 A1 Jun. 5, 2003

Related U.S. Application Data

(60) Provisional application No. 60/338,823, filed on Nov. 3, 2001.

(51) Int. Cl.[7] .......................... C09J 101/08; C09J 163/00
(52) U.S. Cl. .......................... 522/88; 522/167; 522/170; 522/138; 522/141; 522/144
(58) Field of Search .......................... 522/88, 138, 141, 522/144, 167, 170; 528/271, 310, 323, 367, 418, 421, 423, 422

(56) References Cited

U.S. PATENT DOCUMENTS

| 4,657,779 | A | * | 4/1987 | Gaske |
| 4,745,003 | A | * | 5/1988 | Sirkoch et al. ............. 427/514 |
| 5,426,130 | A | * | 6/1995 | Thurber et al. |
| 5,484,864 | A | * | 1/1996 | Usifer et al. ................. 526/301 |
| 6,348,118 | B1 | * | 2/2002 | Johnson et al. |
| 6,500,878 | B1 | * | 12/2002 | Reich et al. ................. 522/100 |

* cited by examiner

*Primary Examiner*—Susan Berman
(74) *Attorney, Agent, or Firm*—Ira S. Dorman

(57) ABSTRACT

A free radical-curable epoxy composition comprises epoxy resin and a copolymerizable material including a monomer having amide, acrylamide, or hydroxyl functionality, and is advantageously devoid of any cationic catalyst ingredient.

9 Claims, 1 Drawing Sheet

PHOTOPOLYMERIZABLE EPOXY COMPOSITION

CROSS-REFERENCE TO RELATED APPLICATION

This application claims the benefit of U.S. Provisional Application No. 60/338,823, filed Nov. 3, 2001.

BACKGROUND OF THE INVENTION

Cationic catalysts are normally employed for effecting polymerization of epoxy compositions. A primary disadvantage of such systems resides in the fact that such photoinitiators are poisoned by bases, thereby retarding reaction or arresting it completely, particularly in the presence of high humidity and water.

In contrast, free radical reactions are highly desirable in adhesives, potting compounds and the like, for a number of reasons. They are capable of effecting deep curing (orders of magnitude thicker than similar resins cured with cationic photoinitiators), photocuring is typically completed in very brief exposure times, and there is little or no tendency for premature reaction.

SUMMARY OF THE INVENTION

The objects of the present invention are to provide compositions having the foregoing features and advantages.

It has now been found that certain of the foregoing and related objects of the invention are attained by the provision of a photopolymerizable composition comprising, based upon the weight of the composition, about 5 to 45 percent of an epoxy resin, about 94 to 55 percent of a copolymerizable material (i.e., monomer and/or oligomer), and about 1 to 10 percent of a free radical photoinitiator, the composition being devoid of any catalytic cationic ingredient. Comparable objects may be attained by the provision of a photopolymerizable composition comprising, based upon the weight of the composition, about 5 to 45 percent of an epoxy resin, about 94 to 55 percent of a copolymerizable material, and about 1 to 10 percent of a free radical photoinitiator, wherein the copolymerizable material includes an effective amount of at least one compound selected from the comonomer group consisting of vinyl and (meth)acrylic monomers containing acrylamide or amide functionality, or an hydroxyl group, and may or may not include a cationic catalyst. Typically, the members of the comonomer group employed will include N,N-dimethyl acrylamide, n-vinyl 2-pyrrolidone, n-vinylcaprolactam, acryloyl morpholine, N-(n-butoxymethyl) acrylamide, N-isopropyl acrylamide, N-3 dimethylaminopropyl methacrylamide, glycerol 1,3-diglycerolate diacrylate, 4-hydroxybutyl acrylate, 2-hydroxyethyl methacrylate, and (meth)acrylic acid; this group may also include acrylated polyols and vinyl polyols, albeit such compounds may be of either monomeric or oligomeric character.

When the comonomer is or includes a compound containing the amide or acrylamide functionality, that compound will usually be present in an amount not in excess of 80 weight percent, and preferably the amount will be at least about 50 weight percent. When the comonomer is or includes a compound containing the hydroxyl group, that compound will usually be present in an amount not in excess of about 70 weight percent, and preferably the amount will be at least about 20 weight percent. The composition may, more specifically, comprise about 15 to 30 weight percent of epoxy resin, about 40 to 60 weight percent of at least one comonomer, about 20 to 35 weight percent of an oligomer that is reactive with the epoxy resin and the comonomer, and about 2 to 5 weight percent of the photoinitiator.

Additional objects of the invention are attained by the provision of a fluid mixture capable of curing to a substantially nonshrinking and immobile solid mass (e.g., a positioning resin), comprising: about 10 to 50 percent, based upon the weight of the mixture, of a photopolymerizable composition, as herein described, which is capable of reaction to form a solid, resinous matrix; and conversely, about 90 to 50 percent, based upon the weight of the mixture, of a solid filler comprised of spherical elements and short fibrous elements present in a spherical element:fibrous element weight ratio in the range 0.1 to 6:1, the filler elements being substantially nonreactive to the reactive composition and exhibiting good adhesion to the resinous matrix. Preferably, the amount of reactive composition will be at least 25 weight percent, and the amount of the filler elements will not exceed, in combined weight, about 75 percent.

The spherical filler elements will usually constitute about 30 to 45 weight percent of such a mixture, and the fibrous elements may constitute about 10 to 80 weight percent thereof. Preferably, the fibrous elements will constitute about 20 to 30 weight percent of the mixture, and the spherical element: fibrous element ratio range will be about 1 to 3:1. The spherical and fibrous filler elements will generally be made of glass, for transparency and low coefficient of thermal expansion (albeit ceramic, mineral, metal, and synthetic and natural resinous elements may be employed in certain instances), and they may or may not carry a size coating. The spherical elements will preferably be hollow, with a distribution range of 5 to 20 microns and a mean size of 9 to 13 microns; the fibrous elements will preferably be short, small diameter milled fibers with a screen size (hole diameter) parameter ranging from $1/16$ to $1/64$ inch. Typically, the sphere diameter will be 10 mils or smaller, and equal to or (preferably) less than the diameter of the fibers. The size, composition, and form of the spheres and fibers will generally be selected so as to afford good suspension stability in the mixture. The solid mass produced will most desirably have a glass transition temperature in excess of 100° C.

DESCRIPTION OF THE DRAWING

As can be seen, Adhesives 1 and 2 show minimal movement with increasing temperature, and thus afford exceptional positional stability to components secured thereby, coupled with high levels of durability. Moreover, FIG. 1 shows that the dimensional stability of Adhesives 1 and 2 is not dependent upon $T_g$ values.

DESCRIPTION OF PREFERRED AND ADDITIONAL EMBODIMENTS

EXAMPLE ONE

Figure 1:
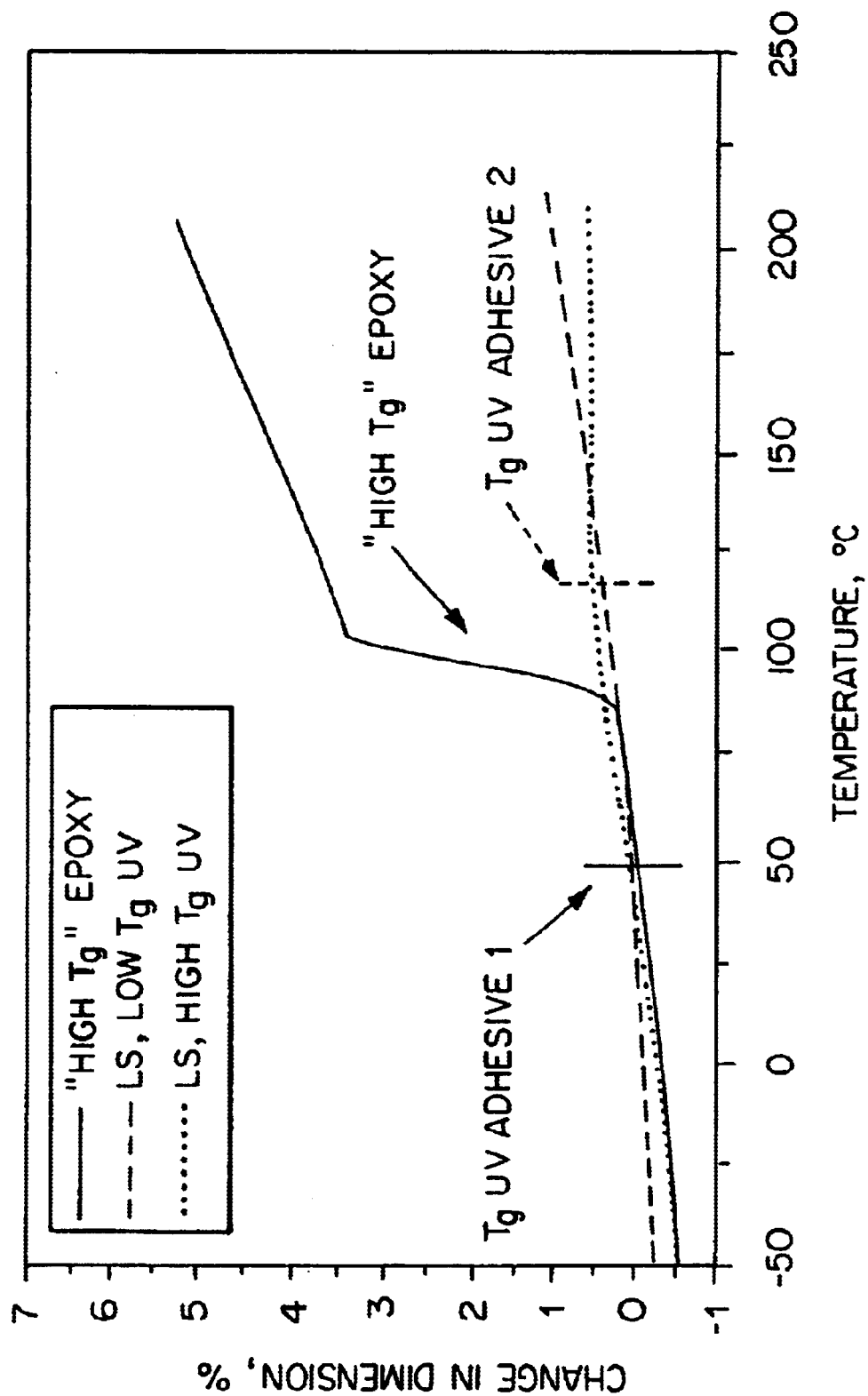
FIG. 1 is a graph showing the percentage change in linear dimension, as a function of temperature, of three adhesives. The low $T_g$ adhesive (Adhesive 1) consists, on a weight basis, of an acrylamide monomer (11%), a triacrylate monomer (5%), UV and visible photoinitiators (1.5% each), silane (1%), urethane oligomer (11%), milled EC glass fibers, screen size $1/32$ inch and nominal diameter of 16 microns (26%), glass spheres of 8 micron nominal diameter (40%), and acrylic acid (3%). The high $T_g$ adhesive (Adhesive 2) is similar, but contains 9% of the acrylamide monomer, 8% of the triacrylate monomer, and 10% of the oligomer. The "High $T_g$ Epoxy" data are provided for purposes of comparison; the resin is conventional, and does not embody the invention.

Compositions are prepared by combining the ingredients identified in Table One below, in the amounts (by weight) set forth. Droplets of each composition on a microscope slide are cured by subjecting them to UV/visible actinic radiation (100 mW/cm², 30 seconds exposure), and are tested; the observations made are set forth in the Table (DAROCUR 1173 and IRGACURE 184 are UV/visible photoinitiators).

Compositions 1 through 6 embody the invention, and demonstrate free radical polymerization of acrylamide and hydroxyacrylate with epoxy compounds, whereas compositions 7 and 8 confirm the relatively poor results this would be expected in attempting to polymerize epoxy resin formulations with free radical photoinitiators only (i.e., without a cationic catalyst). The excellent curing that occurs in compositions 1 through 6, due ostensibly to the presence of acrylamide and/or hydroxyl functionalities will, on the other hand, be recognized by those skilled in the art to be a most surprising result. It is also to be noted that none of these compositions cures unless and until it is subjected to actinic radiation of suitable wavelength. This is so despite the presence of what might be regarded to be an activating species, e.g., the hydroxyl group in the HEMA of compositions 1 and 3.

TABLE ONE

| Ingredient | 1 | 2 | 3 | 4 | 5 | 6 | 7 | 8 |
|---|---|---|---|---|---|---|---|---|
| N,N-dimethyl acrylamide (DMA) | 49.0 | 74.0 | — | 49.0 | 74.0 | — | — | — |
| Hydroxyethylmethacrylate (HEMA) | 24.5 | — | 74.0 | 24.5 | — | 74.0 | — | — |
| Tactic 742, multifunctional epoxy Tris(hydroxyl phenyl) methane-based epoxy, Ciba | 23.0 | 22.5 | 22.5 | — | — | — | — | — |
| GY 6010, Bisphenol A epoxy, Ciba | — | — | — | 23.0 | 22.5 | 22.5 | 96.5 | 22.5 |
| Isobornyl acrylate (IBOA) | — | — | — | — | — | — | — | 74.0 |
| Darocur 1173 | — | — | — | 3.5 | 3.5 | 3.5 | 3.5 | 3.5 |
| Irgacure 184 | 3.5 | 3.5 | 3.5 | — | — | — | — | — |
| Total grams | 100.0 | 100.0 | 100.0 | 100.0 | 100.0 | 100.0 | 100.0 | 100.0 |
| Test | | | | | | | | |
| cure through | yes | yes | yes | yes | yes | yes | no cure | yes |
| surface | tack free | tack free | tack free | tack free | tack free | tack free | liquid | tack free |
| pick test adhesion to glass | good | good | good | good | good | good | na | poor |
| uniform | yes | yes | yes | yes | yes | yes | na | plasticized |
| cured color | clear | clear | clear | clear | clear | hazy | clear | swirls |

TABLE TWO

| Ingredient | 9 | 10 | 11 | 12 | 13 | 14 | 15 |
|---|---|---|---|---|---|---|---|
| n-Vinyl 2-pyrrolidone | — | — | — | — | — | — | — |
| n-Vinylcaprolactam | 49.24 | — | — | — | — | — | — |
| Acryloyl Morpholine | — | — | — | — | — | — | 51.86 |
| N,N-dimethyl acrylamide | — | — | 47.17 | 48.72 | 48.56 | 49.27 | — |
| N-(n-butoxymethyl) acrylamide | — | 42.79 | — | — | — | — | — |
| N-isopropyl acrylamide | — | — | — | — | — | — | — |
| N-3-Dimethylaminopropyl methacrylamide | — | — | — | — | — | — | — |
| Glycerol 1,3-diglycerolate diacrylate | 24.69 | — | 24.84 | — | — | — | 24.89 |
| 4-Hydroxybutyl acrylate | — | — | — | 24.75 | — | — | — |
| 2-Hydroxyethyl methacrylate | — | 34.52 | — | — | 24.28 | — | — |
| Acrylic acid | — | — | — | — | — | 25.45 | — |
| Tactic 742, multifunctional epoxy Tris(hydroxyl phenyl) methane-based epoxy | 20.22 | 17.49 | 22.52 | 21.02 | 21.79 | 20.10 | 18.67 |
| GY 6010, diglycidyl ether of bisphenol A | — | — | — | — | — | — | — |
| Darocur 4265 | 5.84 | 5.20 | 5.47 | 5.51 | 5.37 | 5.19 | 4.58 |
| Total grams | 100.00 | 100.00 | 100.00 | 100.00 | 100.00 | 100.00 | 100.00 |
| adhesion to glass, pick test | very good | excellent | excellent | excellent | excellent | excellent | excellent |
| adhesion to steel, pick test | good | poor | good | excellent | excellent | excellent | fair |
| through cure | yes | yes | yes | yes | yes | yes | yes |
| tack free surface | yes | yes | yes | yes | yes | yes | yes |
| QC stability test, 140° F. oven, > 2 days = pass | pass | pass | pass | pass | pass | pass | pass |

| Ingredient | 16 | 17 | 18 | 19 | 20 | 21 | 22 |
|---|---|---|---|---|---|---|---|
| n-Vinyl 2-pyrrolidone | — | — | — | — | 39.15 | — | — |
| n-Vinylcaprolactam | — | — | — | — | — | — | — |
| Acryloyl Morpholine | — | — | — | — | — | — | — |
| N,N-dimethyl acrylamide | — | 50.97 | — | 49.71 | — | 22.29 | 18.95 |
| N-(n-butoxymethyl) acrylamide | — | — | — | — | — | — | — |
| N-isopropyl acrylamide | 23.59 | — | — | — | — | — | — |
| N-3-Dimethylaminopropyl methacrylamide | — | — | 46.33 | — | — | — | — |
| Glycerol 1,3-diglycerolate diacrylate | — | 26.39 | 25.00 | 24.60 | 20.98 | — | — |
| 4-Hydroxybutyl acrylate | — | — | — | — | — | — | — |
| 2-Hydroxyethyl methacrylate | 44.50 | — | — | — | — | 20.93 | 17.78 |
| Acrylic acid | — | — | — | — | — | — | — |

TABLE TWO-continued

| | | | | | | | |
|---|---|---|---|---|---|---|---|
| Tactic 742, multifunctional epoxy | 24.92 | — | 25.00 | 21.25 | 36.00 | 8.05 | 6.84 |
| Tris(hydroxyl phenyl) methane-based epoxy | | | | | | | |
| GY 6010, diglycidyl ether of bisphenol A | — | 17.36 | — | — | — | 42.70 | 51.3 |
| Darocur 4265 | 6.99 | 5.28 | 3.66 | 4.44 | 3.87 | 6.04 | 5.13 |
| Total grams | 100.00 | 100.00 | 100.00 | 100.00 | 100.00 | 100.00 | 100.00 |
| adhesion to glass, pick test | very good | very good | not tested | fair | fair | fair | too much epoxy |
| adhesion to steel, pick test | excellent | poor | not tested | poor | fair | fair+ | |
| through cure | yes | yes | yes | yes | yes | yes | plasticizie |
| tack free surface | yes | yes | yes | yes | yes | yes | no |
| QC stability test, 140° F. oven, > 2 days = pass | pass | pass | polmerizes in hours at room temperature | pass | pass | pass | pass |

EXAMPLE TWO

A series of compositions are prepared by combining the ingredients identified in Table Two below, in the amounts (by weight) set forth. Droplets of each composition on a microscope slide are cured by subjecting them to UV/visible actinic radiation (150 mW/cm$^2$, 15 seconds exposure), and are tested; observations made are set forth in the Table (DAROCUR 4265 is a UV/visible photoinitiator). Compositions 9 through 22 demonstrate polymerization of epoxy formulations using only free-radical photoinitiators, albeit (as noted in the Table) the amount of epoxy in composition 22 exceeded that which would provide a satisfactory product. It is expected, in accordance with the present invention, that all vinyl amides and acrylamides that free-radical photocure, and all (meth)acrylates containing an hydroxyl group, would react similarly.

EXAMPLE THREE

A series of compositions are prepared by combining the ingredients identified in Table Three below, in the amounts (by weight) set forth. Droplets of each composition on a microscope slide are cured by subjecting them to UV/visible actinic radiation (100 mW/cm$^2$, 30 seconds exposure), and are tested; observations made are set forth in the Table. These data show that the acrylamide and hydroxylated methacrylate compositions which contain only a free-radical photoinitiator cure significantly better than when they contain both a free-free radical photoinitiator and also a cationic photoinitiator.

More particularly the acrylamide formula 23 cures to a tack-free condition in 30 seconds, while the surface of equivalent composition, with added cationic photoinitiator (formulation 24) remains tacky; thus, the combination of two kinds of photoinitiators diminishes the reaction rate. Similarly, by comparing formulations 25 and 26 it is seen that the surface of the hydroxyl-containing acrylate-based composition is slower curing and non-uniform in the dual photoinitiator version, as is also seen to be true of the acrylamide/hydroxymethacrylate systems, by comparing compositions 27 and 28. Formulations equivalent to formulations 23 and 25, but containing a cationic photoinitiator only, failed to cure under the reaction conditions described.

One of ordinary skill in the art would not expect the epoxy resin-containing formulations to cure in the presence of free radical photoinitiators only; nevertheless, good curing is seen to occur in compositions 23, 25 and 27. On the other hand, one skilled in the art would expect these compositions to be more reactive in the presence of cationic photoinitiators; to the contrary, however, the addition of such an agent is seen to retard (compositions 24, 26 and 28), or indeed to effectively preclude, polymerization.

TABLE THREE

| Ingredients | 23 | 24 | 25 | 26 | 27 | 28 |
|---|---|---|---|---|---|---|
| N,N-dimethyl acrylamide | 74.0 | 72.3 | — | — | 49.0 | 70.5 |
| HEMA | — | — | 74.0 | 71.1 | 24.5 | — |
| IBOA | — | — | — | — | — | — |
| Tactic 742, multifunctional epoxy | — | — | — | — | 23.0 | 22.2 |
| Tris(hydroxyl phenyl) methane-based epoxy | | | | | | |
| GY 6010 | 22.5 | 21.5 | 22.5 | 22.3 | — | — |
| Irgacure 184 | — | — | — | — | 3.5 | 4.0 |
| Darocur 1173 | 3.5 | 3.3 | 3.5 | 3.3 | — | — |
| UVI-6976, Mixed Triarylsulfonium | — | 3.0 | — | 3.3 | — | 3.3 |
| Hexafluoroantimonate salts | | | | | | |
| Total grams | 100.0 | 100.0 | 100.0 | 100.0 | 100.0 | 100.0 |
| Tests | | | | | | |
| cure through | yes | cures | yes | cures | yes | poor |
| surface | tack free | tacky | tack free | tacky | tack free | tacky |
| pick test adhesion to glass | good | good | good | good | good | good |
| uniform | yes | good | yes | ripples | yes | rippled |
| cured color | clear | clear | hazy | hazy | clear | orange |

EXAMPLE FOUR

Additional formulations that are exemplary of the invention, which are metal filled for electrical conductivity, are described below in Table Four; the UV photoinitiator referred to is a free radical generator. The resins produced exhibit high $T_g$ values and stiffness, and have low outgassing properties during curing.

TABLE FOUR

| Ingredients | 29 | 30 | 31 |
|---|---|---|---|
| DMA | 46.9 | 16.0 | 16.4 |
| Functionalized cellulose | 24.0 | 7.8 | 8.2 |
| UV Photoinitiator | 3.5 | 1.5 | 1.5 |
| Epoxy | 21.5 | 7.2 | 7.6 |
| Silica Thickener | 4.0 | — | 1.0 |
| Potters Ag filament, SF82TF8 Silver Fiber | — | — | 63.0 |
| AB0022 Silver Flakes, 70 μm, −325 mesh, Chemet | — | 61.0 | — |
| AB0222 Silver Flakes, 35 μm, −425 mesh, Chemet | — | 6.0 | 1.9 |
| t-butyl perbenzoate | — | 0.5 | 0.4 |
| | 99.9 | 100.0 | 100.0 |

EXAMPLE FIVE

Exemplary of the effects of utilizing fillers in two different resins (Resin A and Resin B) are the data set forth below in Table Five. Resin A may be formulated in accordance with U.S. Pat. No. 4,964,938, Example One. Resin B is the composition employed to produce (by the addition of the filler elements) the high $T_g$ adhesive (Adhesive 2) described above in connection with FIG. 1. The photoinitiators referred to are free radical generators, the $Al_2O_3$ and aluminum trihydroxide (ATH) fillers are of particulate form, and the "EC Glass fiber" referred to (Owens Corning 731EC; 1/32 inch) carries an epoxy size coating; the shear data in the sixth and seventh columns (976 and 3494 psi, respectively) illustrate the surprising effect that the inclusion of spherical elements has upon adhesion in the presence of a size coating, as mentioned above.

Moreover, as can be seen by comparing the data in the last three columns of the Table with the data in the first five columns, formulations that include a fiber/sphere filler mixture uniquely produce resins in which shrinkage is minimized and is not proportional to filler content. The data in respect of shrinkage upon heating to 120° C., the data in respect of filler separation, and the data in respect of viscosity all demonstrate the unexpected benefits that are derived from the mixed filler-containing formulations.

TABLE FIVE

| | Resin A Unfilled | Resin B unfilled | Resin A 60% Al2O3 filler | Resin B 60% ATH filler | Resin A + 60% Ceramic Spheres | Resin A + 65% EC-Glass fiber | Resin A + 26% EC-Glass fiber + 40% glass spheres | Resin B + 23% EC-Glass fiber + 35% glass spheres |
|---|---|---|---|---|---|---|---|---|
| Linear Shrinkage during UV cure ASTM D-2556 | 2.0% | 1.4% | 0.6% | 0.6% | 0.8% | <0.1% | <0.1 | <0.1 |
| Shrinkage after UV and Heating to 120° C., 16 hrs | 3.5% | 3.5% | 1.5% | 1.0% | 1.6% | <0.1% | <0.1 | <0.1 |
| Filler separation at 70° F. | No filler | No filler | 10–20 weeks | 15 weeks | 1 day | >20 weeks | >20 weeks | >20 weeks |
| Brookfield Viscosity at 20 rpm | 400 cP liquid | 3,000 cP liquid | 90,000 cP paste | 200,000 cP paste | 200,000 cP paste | Paste too thick to measure | 50,000 cP Gel | 120,000 cP Gel |
| Tensile Compression Shear, Glass to Glass | 3400 psi | 2417 psi | 3000 psi | 1780 psi | 3511 psi | 976 psi* | 3494 psi | 1937 psi |

*adhesive failure (adhesive pulls off glass) in all other joints the glass broke before the adhesive

EXAMPLE SIX

Table Six defines additional filled positioning resins. Here again, the photoinitiators referred to are free radical generators.

TABLE SIX

| Product Name | D | E | F |
|---|---|---|---|
| acrylamide | 10.77 | — | 18.73 |
| Hydroxyacrylate | — | 9.23 | — |
| acrylate | — | 11.22 | — |
| acrylate | 5.00 | 0.77 | — |
| thickener | — | 0.43 | — |
| monomer/oligomer | — | — | 9.31 |
| epoxy | 0.04 | — | — |
| stabilizer | 0.02 | — | — |
| stabilizer | 0.14 | 0.04 | 0.06 |
| stabilizer | — | — | 0.06 |
| silane | 1.13 | 0.60 | 0.79 |
| silane | — | — | 0.79 |
| UV Photoinitiator | 1.39 | — | — |
| UV Photoinitiator | — | 0.95 | 2.27 |
| UV-Visible Photoinitiator | 1.73 | 0.30 | 0.79 |
| Urethane acrylate oligomer | — | 8.54 | — |
| Urethane acrylate oligomer | 9.83 | — | — |
| Epoxy | — | — | 8.51 |
| Silica thickener | 1.00 | 1.00 | 0.57 |
| EC treated milled glass | 25.75 | 25.47 | 22.66 |
| glass spheres | 40.20 | 39.80 | 35.46 |
| acrylic acid | 3.00 | 1.65 | — |

Without limitation upon the broad concept of the invention, it is noted that suitable epoxide compositions, which may be adapted for use in the practice of the present invention in accordance with the disclosure hereof, are described in the paragraph beginning at line 43 in column 4 of U.S. Pat. No. 4,595,604 and in the passage beginning at line 47 of column 3 through line 65 of column 4 of U.S. Pat. No. 5,514,729; the disclosures of these patents are incorporated hereinto by reference thereto. Many other epoxide formulations are well known, and their suitability for use in the practice of the present invention will be evident to those skilled in the art from the description provided herein; they broadly include cycloaliphatic epoxies, Bisphenol A resins, Bisphenol F resins, resorcinol diglycidyl ether, epoxy phenol novolac resin, epoxy cresol novolac, glycidyl ethers, halogenated diglycidyl ethers, polyglycol diepoxides, epoxidized oils (e.g., epoxidized linseed oil, epoxidized soy bean oil, epoxidized octyl tallate, etc), epoxidized elastomers (e.g., epoxidized polybutadiene, epoxidized polyisoprene, epoxidized rubber), epoxidized siloxanes and silicones, and glycidyl isocyanurates.

Although the concepts of the invention are also not dependent upon the use of any particular free radical photoinitiator, those that respond in the ultraviolet and/or visible spectral regions will normally be preferred, as a practical matter. Indeed, photoinitiators that respond to radiation that includes visible wavelengths will often be employed to greatest advantage.

In addition to the compounds identified above (or more fully defining them), a further listing of conventional free radical photoinitiators that might be utilized herein include hexyltriaryl borates, camphorquinone, dimethoxy-2-phenylacetophenone (IRGACURE 651); 2-benzyl-2-N,N-dimethylamino-1-(4-morpholinophenyl)-1-butanone (IRGACURE 369); bis ($\mu^5$-2,4-cycloypentadien-1-yl) bis[2,6-difluoro-3-(1H-pyrrol-1-yl) phenyl] titanium (IRGACURE 784DC); and 2-hydroxy-2-methyl-1-phenyl-propane-1-one (DAROCURE 1173), as well as the photoinitiators disclosed in U.S. Pat. No. 4,820,744, particularly at line 43, column 4, through line 7, column 7 (which disclosure is incorporated hereinto by reference thereto). Suitable alternative UV/visible photoinitiators include DAROCUR 4265, which is a 50 percent solution of 2,4,5-trimethyl benzoyl diphenyl-phosphine oxide in DAROCUR 1173, and IRGACURE 819, phosphine oxide, phenyl-bis(2,4,6-trimethyl) benzoyl. The formulations may additionally include dye coinitiators, such as QTX, safranine O, eosin B, rose bengal b, cyanine, pyronin GY, pyrillium, cresyl violet, brilliant green, lissamine green BN, rhodamine B, methylene blue, and crystal violet.

Other materials may be incorporated into the instant formulations in addition to the components hereinabove described, to the extent that doing so is consistent with the objects set forth and implicit in the foregoing disclosure. For example, "inert" fillers such as wood flour, cornstarch, glass elements (other than those disclosed) cotton linters, mica, alumina, silica, and the like, may be used to modify viscosity, improve impact resistance, and for other purposes, as may be fillers (other than those disclosed) to increase electrical conductivity. Small amounts of silane coupling agents may be incorporated to enhance bond strength to glass and similar surfaces, and substances such as dyes, flame retarders, stabilizers, viscosity modifiers (thixotropes, whether or not conductive, thickeners, viscosity reducers), plasticizers, antioxidants, chain transfer agents, and the like, may be incorporated as well.

Although amounts of ingredients are expressed hereinabove as parts and percentages by weight, that it is done largely as a matter of convenience; volumetric values will often provide a more meaningful characterization because of the wide variations that exist in the densities of ingredients that are suitable for use herein. While therefore the numerical values expressed herein and in the appended claims will provide guidance to those skilled in the art, they are not to be construed as unduly limiting the scope of the invention.

Thus, it can be seen that the present invention provides compositions that satisfy the objects of the invention, as hereinabove set forth. The use of free radical photoinitiators enables the incorporation of ingredients that poison cationic photoinitiators, e.g., materials of chemically basic character. Moreover, the systems described are capable of deep curing, during brief exposure times and without premature reaction, and they are capable of curing with very little outgassing, the level of which may be far below that which is observed with "standard" free-radical cured acrylated resins.

Having thus described the invention what is claimed is:

1. A photopolymerizable composition comprising, based upon the weight of said composition, about 5 to 45 percent of an epoxy resin, about 94 to 55 percent of a material copolymerizable with said enoxy resin, and about 1 to 10 percent of a free radical photoinitiator, said copolymerizable material including an effective amount of at least one free radically polymerizable compound selected from the comonomer group consisting of (1) an acrylamide and (2) a vinyl or (meth)acrylic monomer containing amide functionality or an hydroxyl group, said epoxy resin and copolymerizable material being reactive with one another in a single step initiated by said free radical photo initiator and having little or no tendency for premature reaction.

2. The composition of claim 1 wherein said comonomer group consists of N,N-dimethyl acrylamide, n-vinyl 2-pyrrolidone, n-vinylcaprolactam, acryloyl morpholine, N-(n-butoxymethyl acrylamide, N-isopropyl acrylamide, N-3-dimethylaminopropyl methacrylamide, glycerol 1,3-diglycerolate diacrylate, 4-hydroxybutyl acrylate, 2-hydroxyethyl methacrylate, acrylated polyols, vinyl polyols, and (meth)acrylic acid.

3. The composition of claim 2 wherein said composition contains about 20 weight percent of epoxy resin and, as said copolymerizable material, about 50 weight percent of N,N-dimethylacrylamide and about 25 percent of at least one cellulosic oligomer.

4. The composition of claim 1 wherein said at least one compound from said comonomer group includes an acrylamide, or a vinyl or (meth)acrylic monomer containing amide functionality, present in an amount not in excess of 80 weight percent.

5. The composition of claim 4 wherein said amount of said at least one compound is at least about 50 weight percent.

6. The composition of claim 1 wherein said comonomer group includes a vinyl or (meth)acrylic monomer compound containing the hydroxyl group, present in an amount not in excess of about 70 weight percent.

7. The composition of claim 6 wherein said amount of said monomer containing the hydroxyl group is at least about 20 weight percent.

8. The composition of claim 1 wherein said composition is devoid of any catalytic cationic ingredient.

9. A photopolymerizable composition comprising, based upon the weight of said composition, about 5 to 45 percent of an epoxy resin, about 94 to 55 percent of a material copolymerizable with said epoxy resin, and about 1 to 10 percent of a free radical photoinitiator, said copolymerizable material including an effective amount of at least one free radically polymerizable compound selected from the comonomer group consisting of N,N-dimethyl acrylamide, n-vinyl 2-pyrrolidone, n-vinylcaprolactam, acryloyl morpholine, N-(n-butoxymethyl acrylamide, N-isopropyl acrylamide, N-3-dimethylaminopropyl methacrylamide, glycerol 1,3-diglycerolate diacrylate, 4-hydroxybutyl acrylate, 2-hydroxyethyl methacrylate, acrylated polyols, vinyl polyols, and (meth)acrylic acid, said epoxy resin and copolymerizable material being reactive with one another in a single step initiated by said free radical photo initiator and having little or no tendency for premature reaction.

\* \* \* \* \*